United States Patent [19]

Kirschbaum

[11] 4,291,233
[45] Sep. 22, 1981

[54] WIND TURBINE-GENERATOR

[75] Inventor: Herbert S. Kirschbaum, Wilkins Township, Allegheny County, Pa.

[73] Assignee: Westinghouse Electric Corp., Pittsburgh, Pa.

[21] Appl. No.: 116,372

[22] Filed: Jan. 29, 1980

[51] Int. Cl.³ .............................................. F03D 1/00
[52] U.S. Cl. ..................................... 290/1 C; 290/44; 290/55; 416/DIG. 4
[58] Field of Search .......................... 290/44, 55, 1 C; 310/118, 119; 416/DIG. 4; 74/686, 705

[56] References Cited

U.S. PATENT DOCUMENTS

| | | |
|---|---|---|
| 317,731 | 5/1885 | Colman et al. |
| 322,796 | 7/1885 | Coffield |
| 323,725 | 8/1885 | Pattison |
| 346,674 | 8/1886 | Newell |
| 353,516 | 11/1886 | Sylvester |
| 792,748 | 6/1905 | Arnold |
| 967,325 | 8/1910 | Carlson |
| 1,068,531 | 7/1913 | Rhodes |
| 1,118,616 | 11/1914 | Apple |
| 1,894,357 | 1/1933 | Manikowske et al. ....... 416/DIG. 6 |
| 2,084,612 | 6/1937 | Engelheart .......................... 171/252 |
| 4,056,746 | 11/1977 | Burtis ................................. 310/118 |

OTHER PUBLICATIONS

"Design Ideas" Wind Powers Contra-Rotating Generator; Lowe; 2-18-74, vol. 29, #4, pp. 66 & 67.

Primary Examiner—J. V. Truhe
Assistant Examiner—Shelley Wade
Attorney, Agent, or Firm—Edward L. Levine

[57] ABSTRACT

A wind-turbine generator system which transforms the rotational energy of a wind driven turbine blade into rotation in opposite directions of a rotor and a stator of a dynamoelectric machine to generate electrical power. A bevel gear rotating with the turbine blade drives two pinion gears and associated concentric shafts in opposite directions. The two shafts combine with a planetary gear set to provide the desired oppositely directed rotation. One of the shafts is associated with a ring carrier and drives a ring gear in one rotational direction. The other shaft drives a planet carrier in the opposite rotational direction. The planetary gear set is arranged such that a sun gear is driven in the direction opposite to that of the ring gear. A rotor is affixed to the sun gear by a spider support structure, and a stator, affixed to rotate with the ring gear, surrounds the rotor. The rotor and stator are thus rotated in opposite, mechanically and electrically additive, directions.

2 Claims, 4 Drawing Figures

WIND TURBINE-GENERATOR

BACKGROUND OF THE INVENTION

1. Field of the Invention

This invention relates to wind powered turbine generator systems.

2. Description of the Prior Art

There is increasing emphasis being placed upon energy conversion systems, and in particular upon those operable by renewable energy resources such as the wind. Among the numerous types of wind driven devices are those including a turbine blade connected to a generally horizontal shaft. Gearing arrangements transform the rotational energy of the turbine shaft to rotation at a different, typically increased, velocity, to rotate the shaft of a dynamoelectric machine and generate electricity.

While numerous arrangements have been utilized to generate electricity from the wind, improvements can be made, particularly in terms of efficiency, weight and associated initial costs. Accordingly, it is desirable to provide improved wind turbine generator systems, particularly those which offer such improved characteristics.

SUMMARY OF THE INVENTION

This invention provides an improved wind powered turbine generator system. In preferred form the rotational energy from a wind turbine, preferably with a substantially horizontal axis, is transferred into rotational energy of two concentric shafts, preferably vertical, through a bevel gearing arrangement. The rotational energy of the two shafts is transferred, through a planetary gearing arrangement, directly into rotational energy of both a rotor and stator of a dynamoelectric machine. The stator radially surrounds the rotor and the two are rotated, by the planetary gearing arrangement, in opposite directions so as to generate electricity.

By rotating the stator component, as well as the rotor, the desired rotational frequency between the structures is achieved through addition of the angular velocities of each. Thus, a portion of the desired speed increase typical between a wind driven turbine blade and a generator shaft is achieved by rotation of both the rotor and stator in opposite directions.

This desirable result is accomplished by rotating the planetary gear train planet and ring gears, with the above mentioned concentric shafts, in opposite directions, and arranging the gear train to drive a sun gear in a direction opposite to that of the ring gear. The rotor is affixed to the sun gear through a light weight spider structure, and the stator is affixed to the ring gear through an outer housing.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENT

Figure 1:
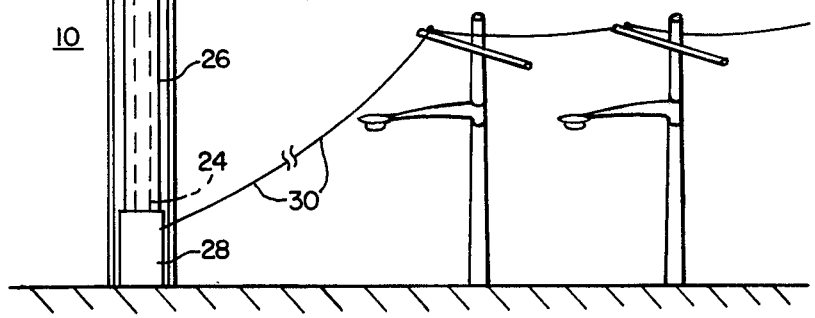
FIG. 1 is a simplified schematic of a wind turbine generator system in accordance with the invention.

Referring now to FIG. 1 there is shown an exemplary wind turbine generator system 10 including a turbine 12 rotatable by the force of the wind 14. In the exemplary system the turbine 12 and affixed generally horizontal turbine shaft 16, and a first portion 18 of speed increasing gearing, are mounted atop a tower 20. The tower can include a rotatable turntable 22 to properly orient the turbine shaft relative to the prevailing wind direction. Rotational energy of the turbine shaft 16 is transferred to rotational energy of shafts 24, 26 which are preferably concentric, rotating in opposite directions. The shafts 24, 26 drive a combined planetary gearing and dynamoelectric machine arrangement 28. The generated electrical power is carried through cable 30 to be used as desired.

Figure 2:
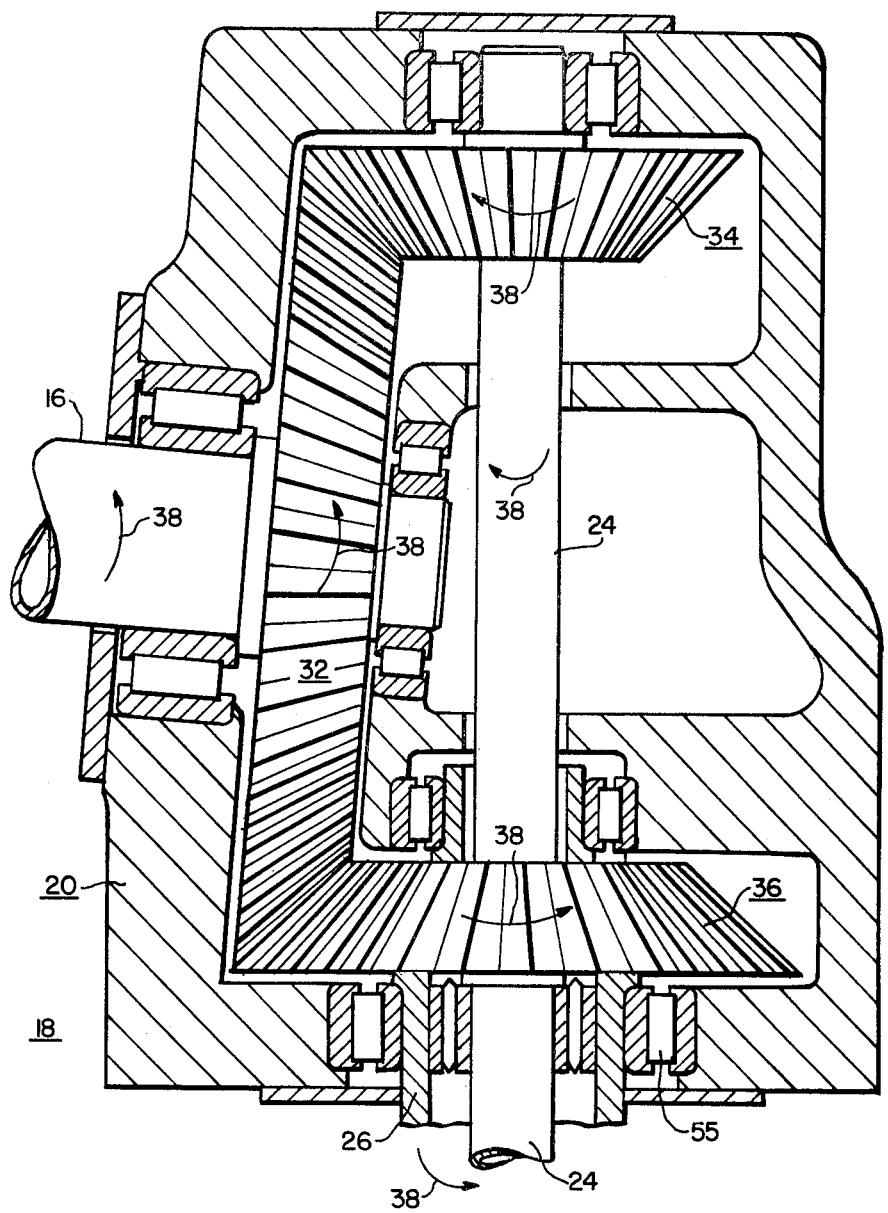
FIG. 2 is a schematic of a gearing arrangement in accordance with the invention.

Additional detail of the first speed increasing portion 18 of the system gearing is shown in FIG. 2. The turbine shaft 16, which can be oriented in any direction and which preferably is horizontal or slightly tilted, is affixed to a main bevel gear 32. Arranged as shown, the main bevel gear 32 interacts with an upper bevel pinion gear 34 and a lower bevel pinion gear 36 which rotate in opposite directions as indicated by the arrows 38.

The upper 34 and lower 36 pinion gears are respectively affixed to the shafts 24, 26, which are preferably concentric, shaft 26 being hollow. The shafts accordingly rotate in opposite directions. As will hereinafter become evident, the desired feature of this arrangement is to provide rotation of two concentric shafts in opposite directions as input to a planetary gearing arrangement. It will be apparent to those skilled in the art that such input rotation can also be obtained using non-intersecting axis gearing driven by the bevel gear 32, such as a hypoid arrangement, which is subsequently converted to concentric rotation of two shafts interacting with the planetary arrangement.

Figure 4:
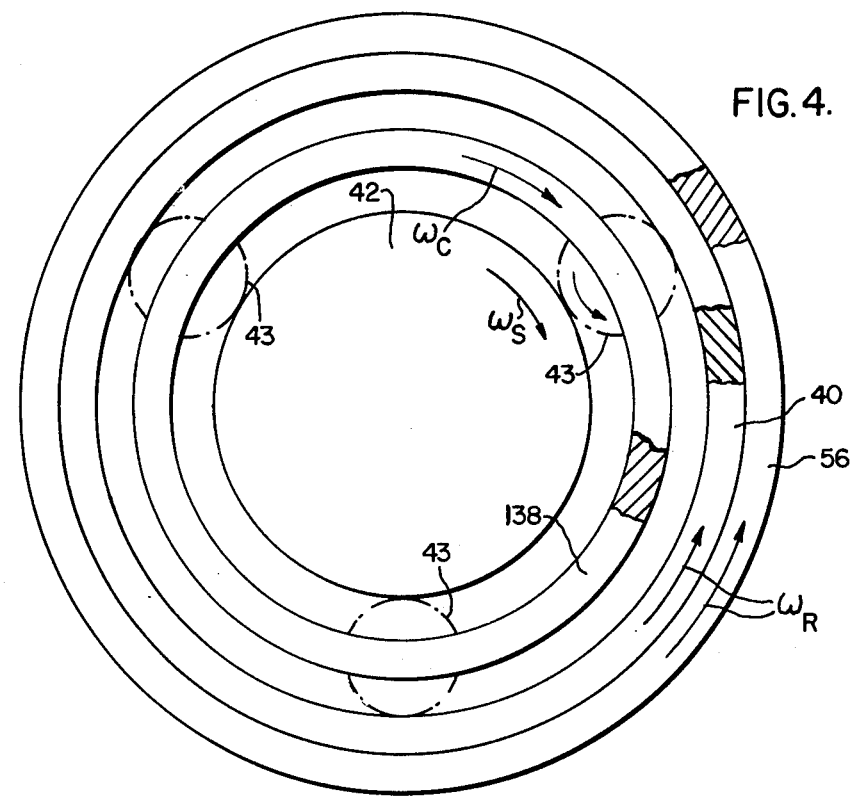
FIG. 4 is a schematic top view of the gearing arrangement of FIG. 3.
Figure 3:
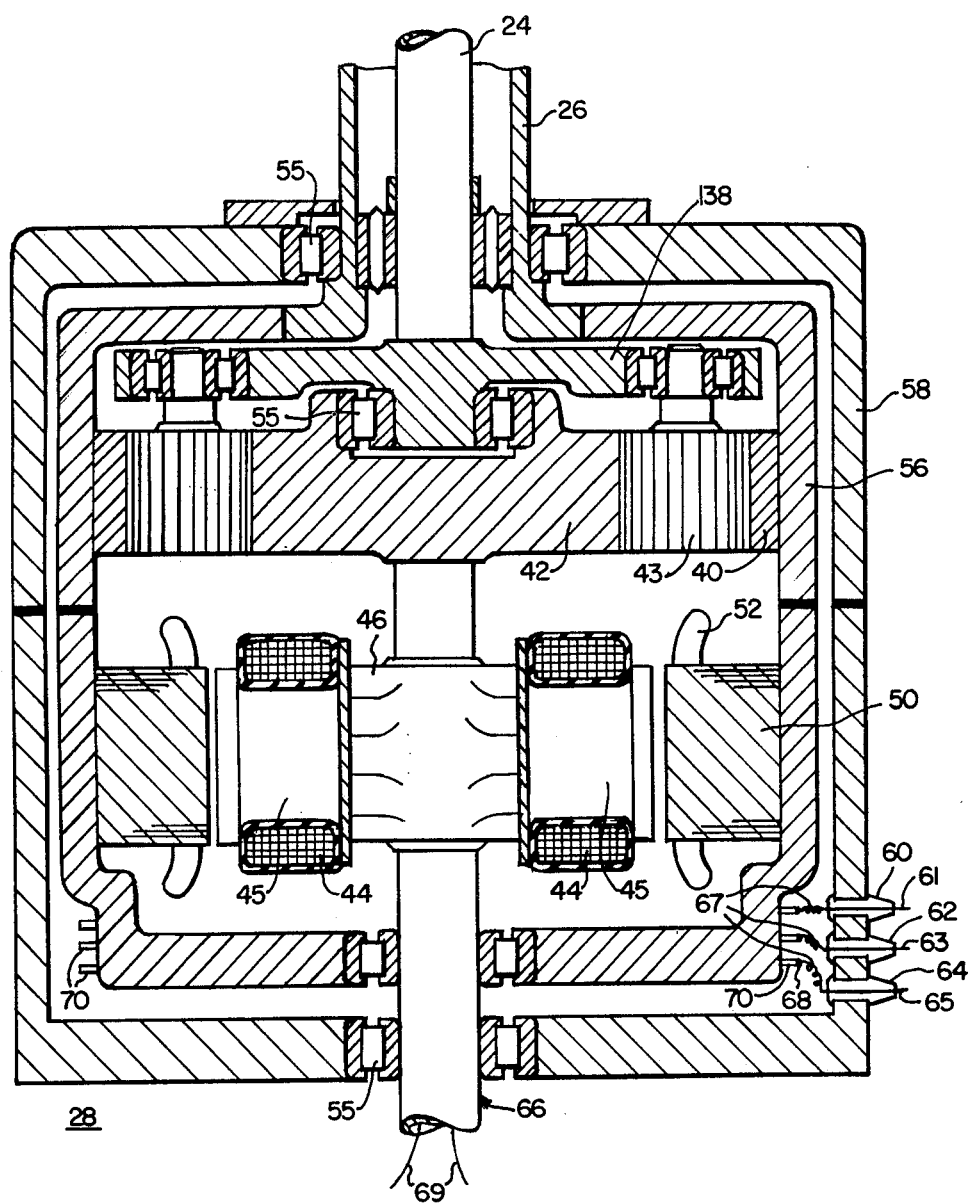
FIG. 3 is an elevation view, in section, of a portion of a wind turbine-generator system in accordance with the invention.

As shown in FIG. 3, the shafts 24, 26 cooperate with the combined planetary gear and dynamoelectric machine arrangement 28. In the preferred arrangement shown in FIGS. 3 and 4, shaft 24 rotates a planet carrier 38 in one direction at a selected velocity $\omega_C$, and shaft 26 rotates a ring gear carrier 56 counterdirectional at a selected velocity, $\omega_R$. The ring gear carrier 56 rotates a ring gear 40 at the selected velocity, $\omega_R$. The arrangement is such that a sun gear 42, through the action of planet gears 43, rotates counterdirectional to the ring gear at velocity $\omega_S$.

Rotatable with the sun gear 42 is a spider assembly 46 attached to and supporting pole pieces 45 and their associated field coils 44. The spider element 46 includes a plurality of discrete arms (not shown) connecting the spider body to the pole pieces, which can substantially reduce the weight of the machine compared to a singular solid support structure. The rotor coils can be arranged to form any convenient number of pole pieces 45, six poles 45 being utilized in the exemplary system.

The ring gear carrier 56, preferably fabricated in two or more segments, is affixed to the shaft 26. Attached to and directly rotatable with the ring gear carrier 56 is a stator 50 including appropriate stator winding coils 52. The structure 50 is herein referred to as a stator, in accordane with its function, although the component rotates. As shown, the stator 50 is positioned radially about the rotor poles 45 and associated coils 44. In this manner, with the stator and generator coils rotating in opposite directions, the rotational velocity between the rotor and the stator is additive.

Appropriate bearings 55 are shown throughout the figures. Surrounding the ring gear and stator carrier 56 is a fixed housing 58. Affixed to the housing 58 are electrically insulated bushings 60, 62, 64 which carry corresponding terminals 61, 63, 65. The terminals are electrically connected, through wires 67, to fixed brushes 68. The fixed brushes 68 are cooperatively positioned to contact associated slip rings 70, which rotate with the ring gear and stator carrier 56. The slip rings are electrically connected to the stator windings 52.

Where the rotor and stator arrangement is of the induction type, as opposed for example to a squirrel cage arrangement, an exciter shaft 66 carrying electrical leads 69 from a brushless exciter, not shown, to the field windings, is affixed to rotate with the spider element 46. A squirrel cage arrangement can also be utilized.

With the disclosed arrangement the relative velocity among the rotor and stator, $\omega_{gen}$, is $$\omega_{gen} = 2(1 + [N_R/N_S])N_1\omega_0$$

where $N_R$ is the number of teeth in the ring gear,
$N_S$ is the number of teeth in the sun gear,
$N_1$ is the average gear increase ratio in the initial bevel drive from shaft 16 to both shafts 24, 26, and
$\omega_0$ is the turbine shaft rotational velocity.

In the exemplary system, with a truly horizontal shaft and, accordingly, identically sized pinion gears whereby the shafts 24, 26 have the same, but oppositely directed, rotational velocities, a 3:1 speed increase from the turbine shaft 16 to each shaft 24, 26 is obtained. A ratio of $N_R/N_S$ equal to 8:1, is readily achieveable. Further, this ratio can be substantially increased through other means such as a compound planetary gear arrangement. The 8:1 ratio provides, in accordance with the above equation, $\omega_{gen} = 2(1+8)3\omega_0$, an overall gear ratio increase of 54:1. Thus, with an exemplary input turbine shaft rotational velocity of only 22.2 rpm, typical for a two megawatt electric size wind turbine generator system, an equivalent generator speed of 1200 rpm is easily obtained. Such speed is compatible with a six pole generator at 60 Hz operation.

Numerous changes may be made in the above-described system without departing from the spirit and scope thereof. It is thus intended that all matter contained in the foregoing description be interpreted as illustrative, and not in a limiting sense.

I claim:

1. A wind turbine generator system comprising:
   (a) a turbine and affixed shaft rotatable by a wind;
   (b) gearing for transposing the rotational energy of said turbine and affixed shaft into rotational energy of a first shaft rotating in one direction and a second concentric shaft rotating in the opposite direction;
   (c) a generator rotor;
   (d) a stator disposed concentrically about said rotor; and
   (e) planetary gearing cooperatively relating said shafts and said rotor and stator such that said rotor rotates in one direction and said stator rotates about said rotor in the opposite direction, said stator being rigidly connected to the outer one of said concentric shafts so as to rotate at the same velocity as said outer shaft, said rotor being driven by said planetary gearing to rotate at a velocity different than the rotational velocity of the inner one of said concentric shafts.

2. A wind turbine generator system comprising:
   (a) a turbine rotatable by the wind;
   (b) a turbine shaft affixed to rotate with said turbine;
   (c) a bevel gear affixed to rotate with said turbine shaft;
   (d) two concentric power shafts;
   (e) two pinion gears cooperatively engaging said bevel gear so as to rotate in opposite directions, each said pinion gear being respectively affixed to one of said concentric power shafts;
   (f) a planetary gear train including a sun gear, a planet carrier, a plurality of planet gears, a ring gear and a ring gear carrier rigidly affixed to said ring gear, one of said concentric shafts driving said planet carrier and the other of said concentric shafts being rigidly affixed to, and driving, said ring gear carrier, said gear train being arranged such that said sun gear rotates in a direction opposite to the rotation of said ring gear and ring gear carrier;
   (g) a generator rotor affixed to rotate with rotation of said sun gear; and
   (h) a generator stator disposed radially about said rotor and rigidly affixed to said ring gear carrier so as to rotate with rotation of said ring gear, ring gear carrier and the other of said shafts.

* * * * *